United States Patent [19]

Taniwa

[11] Patent Number: 5,689,630
[45] Date of Patent: Nov. 18, 1997

[54] INFORMATION REPRODUCING APPARATUS

[75] Inventor: Shigeyuki Taniwa, Yokohama, Japan

[73] Assignee: Canon Kabushiki Kaisha, Tokyo, Japan

[21] Appl. No.: 139,779

[22] Filed: Oct. 22, 1993

Related U.S. Application Data

[63] Continuation of Ser. No. 499,768, Mar. 27, 1990, abandoned.

[30] Foreign Application Priority Data

Mar. 28, 1989 [JP] Japan ................... 1-075416

[51] Int. Cl.⁶ .................................... G06F 12/12
[52] U.S. Cl. ...................... 395/182.06; 395/439
[58] Field of Search .................... 395/800, 275, 395/525, 182.06, 439

[56] References Cited

U.S. PATENT DOCUMENTS

| | | | |
|---|---|---|---|
| 3,698,006 | 10/1972 | Ovshinsky | 46/74 ES |
| 4,360,808 | 11/1982 | Smith, III et al. | 340/825.69 |
| 4,525,839 | 7/1985 | Nozawa et al. | 371/10.2 |
| 4,602,295 | 7/1986 | Moriyama et al. | 358/343 |
| 4,964,094 | 10/1990 | Satoh et al. | 369/59 |
| 4,979,054 | 12/1990 | McCullough et al. | 360/48 |
| 5,030,976 | 7/1991 | Salmon | 346/157 |
| 5,046,042 | 9/1991 | Nitatori et al. | 364/900 |
| 5,056,058 | 10/1991 | Hirata et al. | 364/900 |

*Primary Examiner*—William M. Treat
*Attorney, Agent, or Firm*—Fitzpatrick, Cella, Harper & Scinto

[57] ABSTRACT

An information recording/reproducing apparatus for performing information recording or reproduction with a recorded medium having a plurality of recording blocks. Different categories of information recorded in the recording blocks on the recording medium are read out by a read/write section and are stored in different storage areas corresponding to the categories of the information, and information to be supplied to a host computer or the like is thereafter prepared.

9 Claims, 11 Drawing Sheets

INFORMATION REPRODUCING APPARATUS

This application is a continuation of application Ser. No. 07/499,768 filed Mar. 27, 1990, which is now abandoned.

BACKGROUND OF THE INVENTION

1. Field of the Invention

This invention relates to an information recording/reproducing apparatus used with a recording medium having an information recording format such that a plurality of categories of information are contained in one information block.

2. Description of the Related Art

Ordinarily, recording of information using this type of information recording/reproducing apparatus is performed with a certain block used as a unit. This block is ordinarily called a sector and contains data in the form of a predetermined number of bits, error correction codes and so on.

FIG. 9 schematically shows an example of a format of a sector 50.

The sector 50 contains address information 51, user data 52 and control data 53. For ordinary access, address information 51 is reproduced to confirm the position of the sector 50, and the target sector is thereby accessed. Then recording or reproduction of user data 52 and control data 53 is performed.

User data 52 is a category of data which can be freely recorded or reproduced by the user. Control data 53 is a category of data used for control of the chain connecting user data 52 of a plurality of sectors, and, in most cases, it is not transmitted to the host unit, e.g., a host computer.

A block constituted by a combination of a plurality of sectors 50 is called a track.

FIG. 10 schematically shows an example of a format of a track 60 having this construction.

Each of tracks 60 has ten sectors 50 and one alternative sector 70. The alternative sector 70 is used in a case where one of the ordinary sectors 50 cannot be used owing to a defect or the like. The format of the sector 70 is the same as the ordinary sector.

Ordinarily, each track 60 forms a complete circle if the recording medium is in the form of a disk.

FIG. 11 is a block diagram schematically showing an information recording/reproducing apparatus based on a conventional recording/reproduction system.

In this apparatus, for reproduction of information recorded on an information recording medium 19, data items are successively reproduced from each of the target sectors starting from the top data and are transferred in this order to a storage means 6. After the transfer has been completed, a microprocessor 5 extracts only control data 53 from the information recorded in each sector, and forms data to be transferred to an unillustrated host unit on the basis of control data 53. If in this process one of the ordinary sectors 50 is defective and cannot be used for reproduction, the corresponding alternative sector 70 is used in place of this sector 50. The alternative sector 70 has the same construction as the ordinary sector 50, as shown in FIG. 12, and contains address information 71, user data 72 and control data 73. The correspondence between the defective sector 50 and the alternative sector 70 is confirmed based on the control data 73 of the alternative sector 70.

In accordance with the above-described conventional art, however, all items of information reproduced from the information recording medium are successively taken into the same storage means, and the following problems are therefore encountered which relate to the reconstruction of data transferred to the host unit after storage of information in the storage means.

A) It is necessary to extract only the control data from information recorded in each sector and, hence, to use a complicated control process.

B) With respect to the transfer of data to the host unit, the positions of effective data items are not continuous. The control and preparation of the transferred data is therefore complicated and the processing time is long.

To solve problem B, another storage means may be provided in which transferred data is collected before being transmitted to the host unit. However, the problem of an increase in the processing time is also encountered owing to the operation of shifting the transferred data to the other storage means.

SUMMARY OF THE INVENTION

It is an object of the present invention to provide an information recording/reproducing apparatus free of the above-described drawbacks.

Another object of the present invention is to provide an information reproducing apparatus capable of rapidly transferring information read out of the recording medium to the host unit based on a simple control process.

Still another object of the present invention is to provide an information reproducing apparatus capable of rapidly transferring read information to the host unit by a simple operation even if part of the information to be reproduced is recorded in an alternative area.

To this end, the present invention provides in one of its aspects an information reproducing apparatus which reads out information recorded on a recorded medium having a plurality of recording blocks and which outputs the read information to a host computer, the apparatus comprising: a read means for reading out the information recorded on the recording medium; a storage means for temporarily storing the information read out by the read means having storage areas corresponding to the categories of the information recorded in recording blocks, the storage means storing each category of read information in a corresponding one of the storage areas; and an output means for outputting the information stored in the storage means to the host computer.

Other objects and features of the present invention will become clear upon reading the following description taken in conjunction with the accompanying drawings.

DESCRIPTION OF THE PREFERRED EMBODIMENTS

Figure 1:
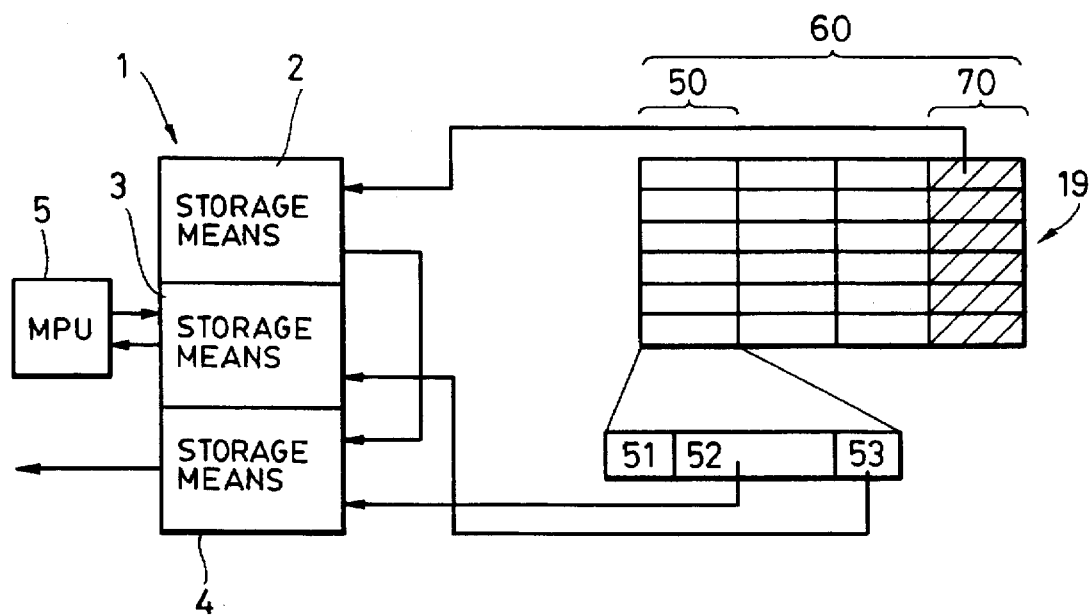
FIG. 1 is a block diagram schematically showing an information recording/reproducing apparatus which represents a first embodiment of the present invention.

FIG. 1 is a block diagram schematically showing an information recording/reproducing apparatus 1 which represents a first embodiment of the present invention.

Figure 9:
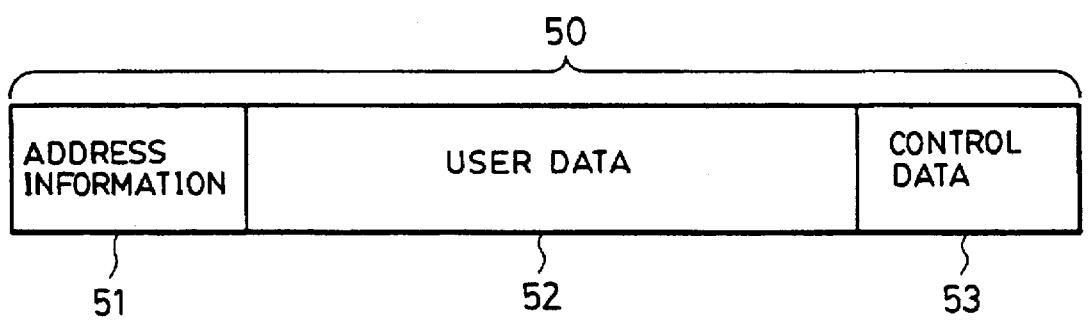
FIG. 9 is a schematic diagram of an example of a format of recording sectors of a recording medium.
Figure 12:
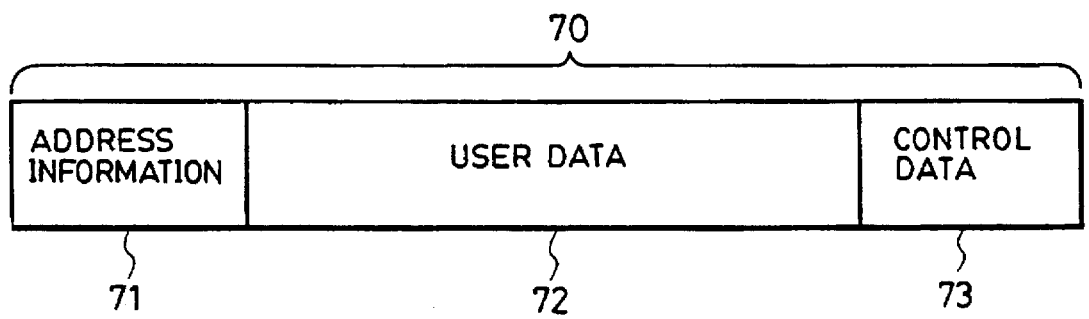
FIG. 12 is a schematic diagram of an example of a format of an alternative sector of the recording medium.
Figure 10:
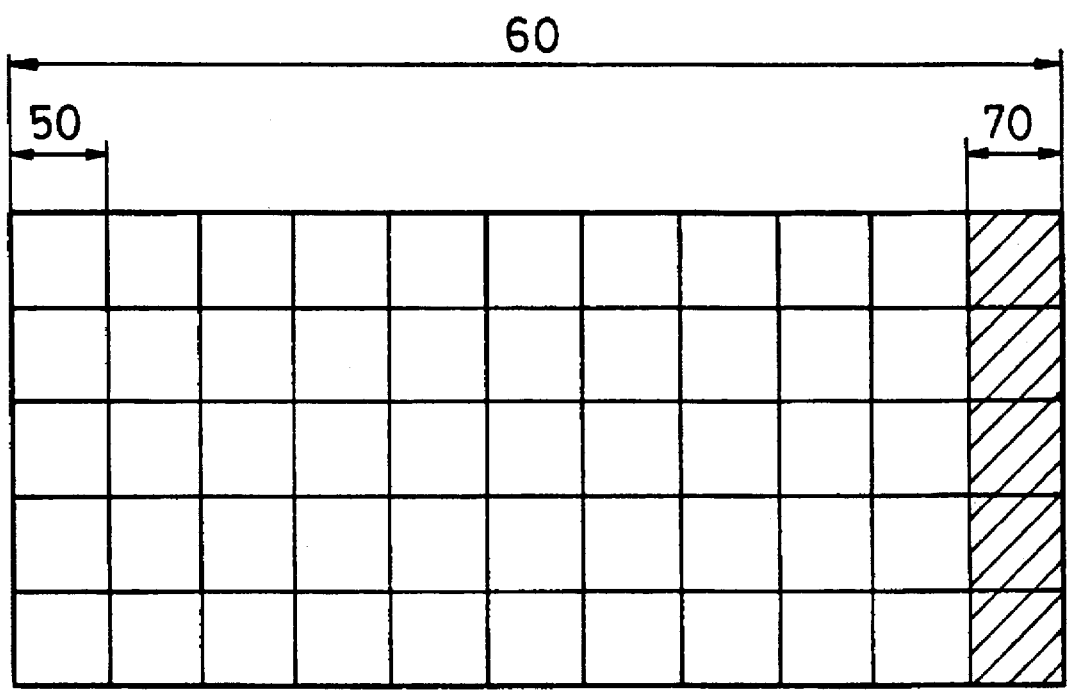
FIG. 10 is a schematic diagram of an example of a format of tracks of the recording medium.
Figure 11:
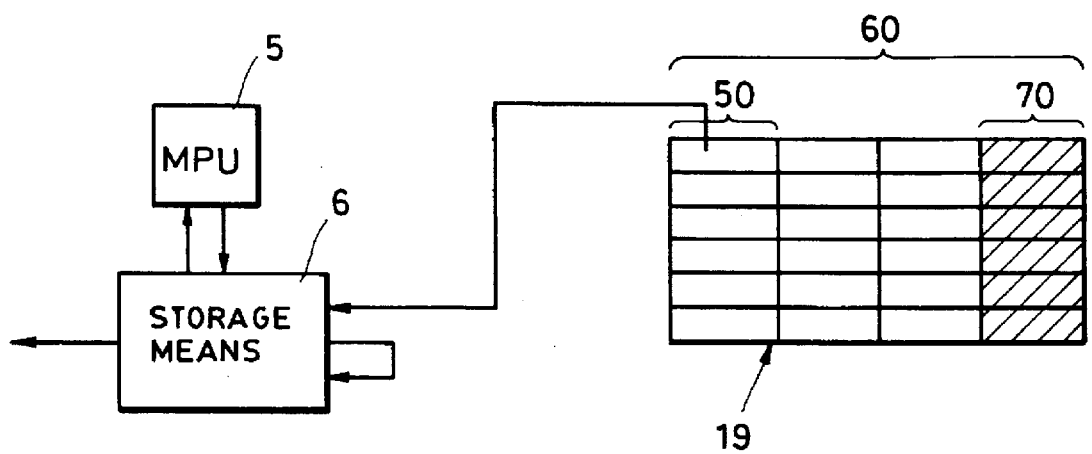
FIG. 11 is a block diagram schematically showing an information recording/reproducing apparatus based on a conventional recording/reproduction system.

An information recording medium 19 used for the information recording/reproducing apparatus 1 has tracks 60 constituted by ordinary sectors 50 and alternative sectors 70. Each of sectors 50 and 70 contains address information 51 or 71, user data 52 or 72 and control data 53 or 73, as in the case of the sectors shown in FIGS. 9 and 12.

The information recording/reproducing apparatus 1 has a storage means 2 for storing user data 72 recorded in the alternative sectors 70, a storage means 3 for storing control data 53 recorded in the ordinary sectors 50, a storage means 4 for storing user data 52 recorded in the ordinary sectors 50, and a microprocessor 5 for reconstructing data reproduced from the alternative sectors 70 and stored in the storage means 2 and the user data 52 stored in the storage means 4 based on the control data 53 stored in the storage means 3.

Figure 2:
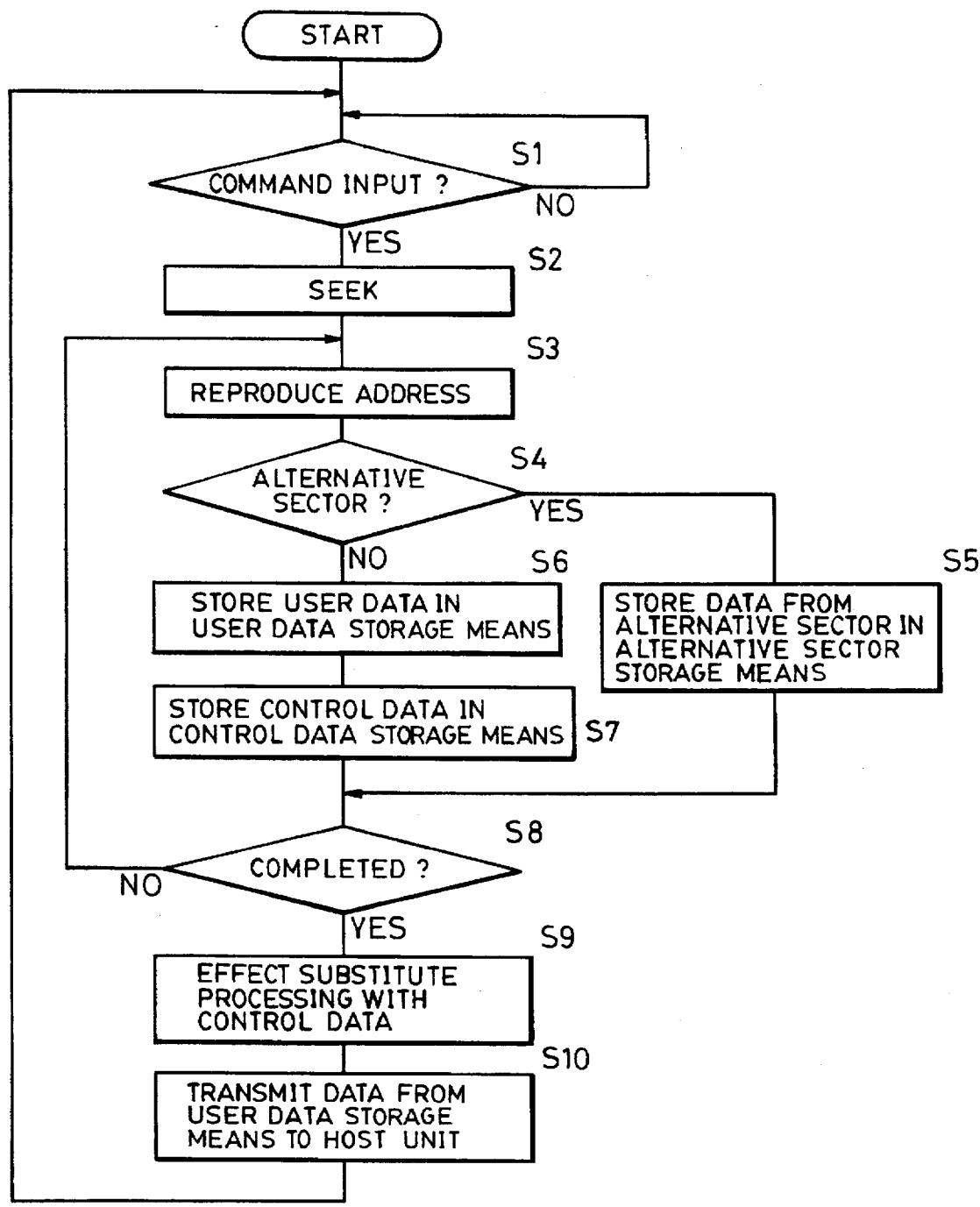
FIG. 2 is a flow chart of the operation of the first embodiment at the time of reproduction.

FIG. 2 shows a flow chart of the operation of this information recording/reproducing apparatus 1 for information reproduction.

When the information recording medium 19 is set in the information recording/reproducing apparatus 1, the apparatus 1 waits to receive a reproduction command from an unillustrated host unit (S1). When apparatus 1 receives the reproduction command along with addresses of sectors from which data is to be reproduced, it seeks a target sector (S2) and reproduces information to address the target sector (S3). Determination is then made based on the address information as to whether or not the target sector is an alternative sector 70 (S4). If NO, user data 52 is successively reproduced and is transferred to and stored in the user data storage means 4 (S6).

Then the control data 53 recorded in the same sector is reproduced and is transferred to and stored in the control data storage means 3 (S7).

If YES in step S4, the user data 72 recorded in the alternative sector is transferred to and stored in the alternative sector storage means 2 (S5).

The same operations as steps S3 to S7 are repeated for the number of sectors designated by the host unit. After the reproduction of the desired data has been completed (S8), substitute processing is conducted (S9). During substitute processing, microprocessor 5 successively reads, for the categories of data previously sorted and stored, the data stored in the control data storage means 3, and transfers the data stored in the alternative sector storage means 2 to predetermined positions in the user data storage means 4 to reconstruct the data transferred to the host unit. After completing this processing, the microprocessor 5 successively sends the data in order from the user data storage means 4 to the host unit (S10).

The process started by the reproduction command is thus completed and the apparatus is set to a next command input waiting state.

Recording of information is performed generally in the same manner as in a conventional system. That is, data is transferred from the host unit to the user data storage means 4, and control data 53 is simultaneously written in the control data storage means 3 by microprocessor 5. At the time of recording on the information recording medium 19, control data is output subsequently to the user data and the categories of data are successively recorded.

Each alternative sector 70 is used in such a manner that if an ordinary sector becomes detective, corresponding user data is output from the user data storage means 4 and is recorded in the alternative sector 70 along with control data 53 relating to the substitute processing. During recording, therefore, the alternative sector storage means 2 may not be used.

Figure 3:
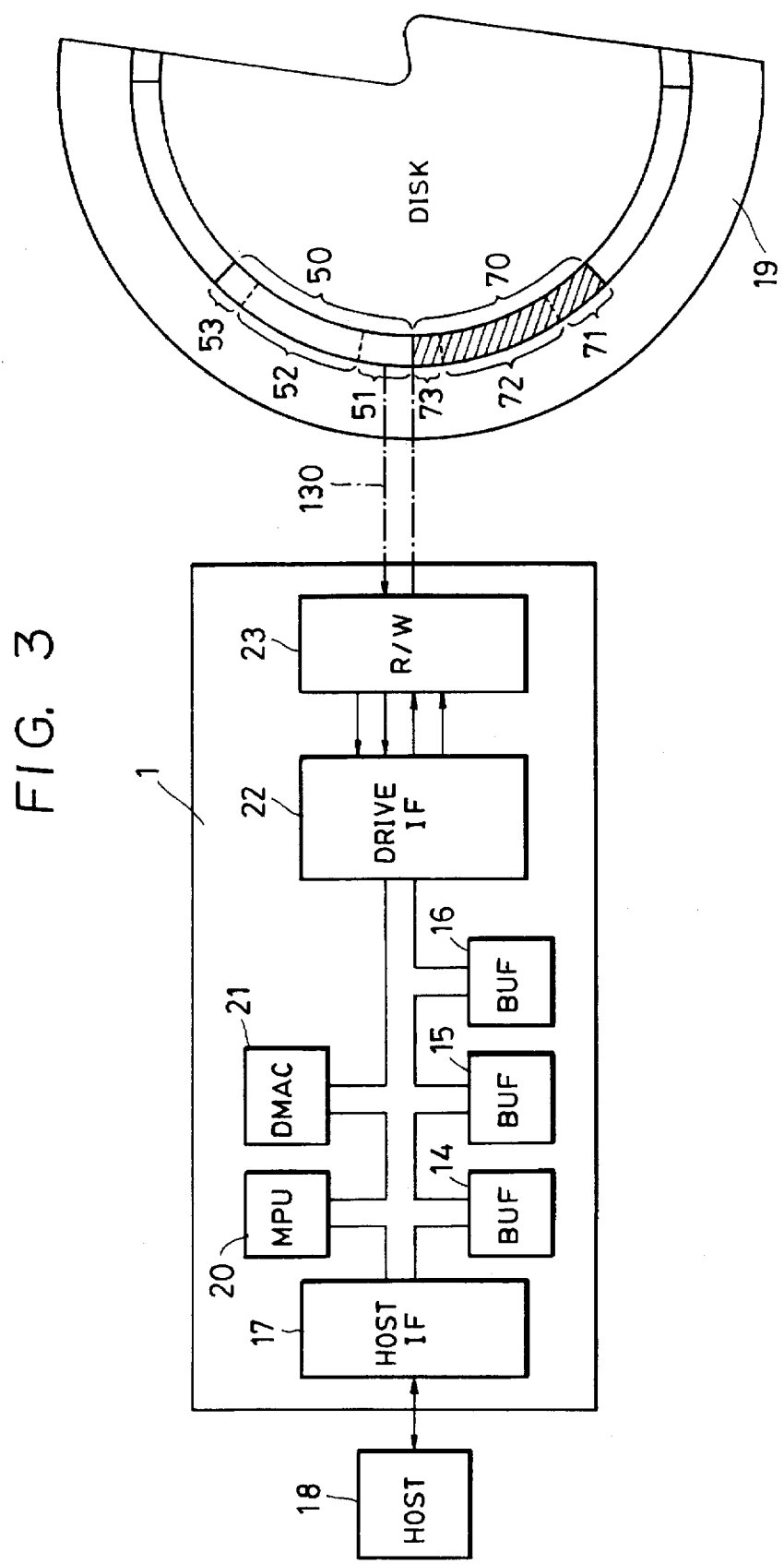
FIG. 3 is a block diagram of a second embodiment of the present invention.

FIG. 3 is a block diagram of a second embodiment of the present invention.

The information recording/reproducing apparatus 1 of this embodiment operates for recording or reproduction of information with an information recording medium 19 in the form of a disk, and has a microprocessor 20 for controlling the whole system, a DMA (direct memory access) controller 21, a drive controller 22, a read/write section 23, buffer memories 14 to 16 and a host interface controller 17. The DMA controller 21 effects DMA transfer between the memories and the input/output devices. The drive controller 22 conducts transmission/reception of recording/reproduction data with the read/write section 23. The read/write section 23 reproduces information from the information recording medium 19 and transmits the reproduced information to the drive controller 22 or, conversely, records information transmitted from the drive controller 22 on the information recording medium 19. The buffer memories 14 to 16 store reproduced information transferred from the drive controller 22 by the DMA controller 21 at the time of reproduction, or store recording information transferred from the host interface controller 17 by the DMA controller 21 at the time of recording. The host interface controller 17 transfers reproduced information to a host computer 18 at the time of reproduction or receives recording information from the host computer 18 at the time of recording.

An optical disk may be is used as the information recording medium 19, and data is written in or reproduced from the recording medium 19 with a light beam 130 output from the read/write section 23. The information recording medium 19 has ordinary sectors 50 and alternative sectors 70. Each of the ordinary sectors 50 contains address information 51, user data 52 and control data 53. Also, each of the alternative sectors 70 contains address information 71, alternative data 72 and control data 73.

Figure 4:
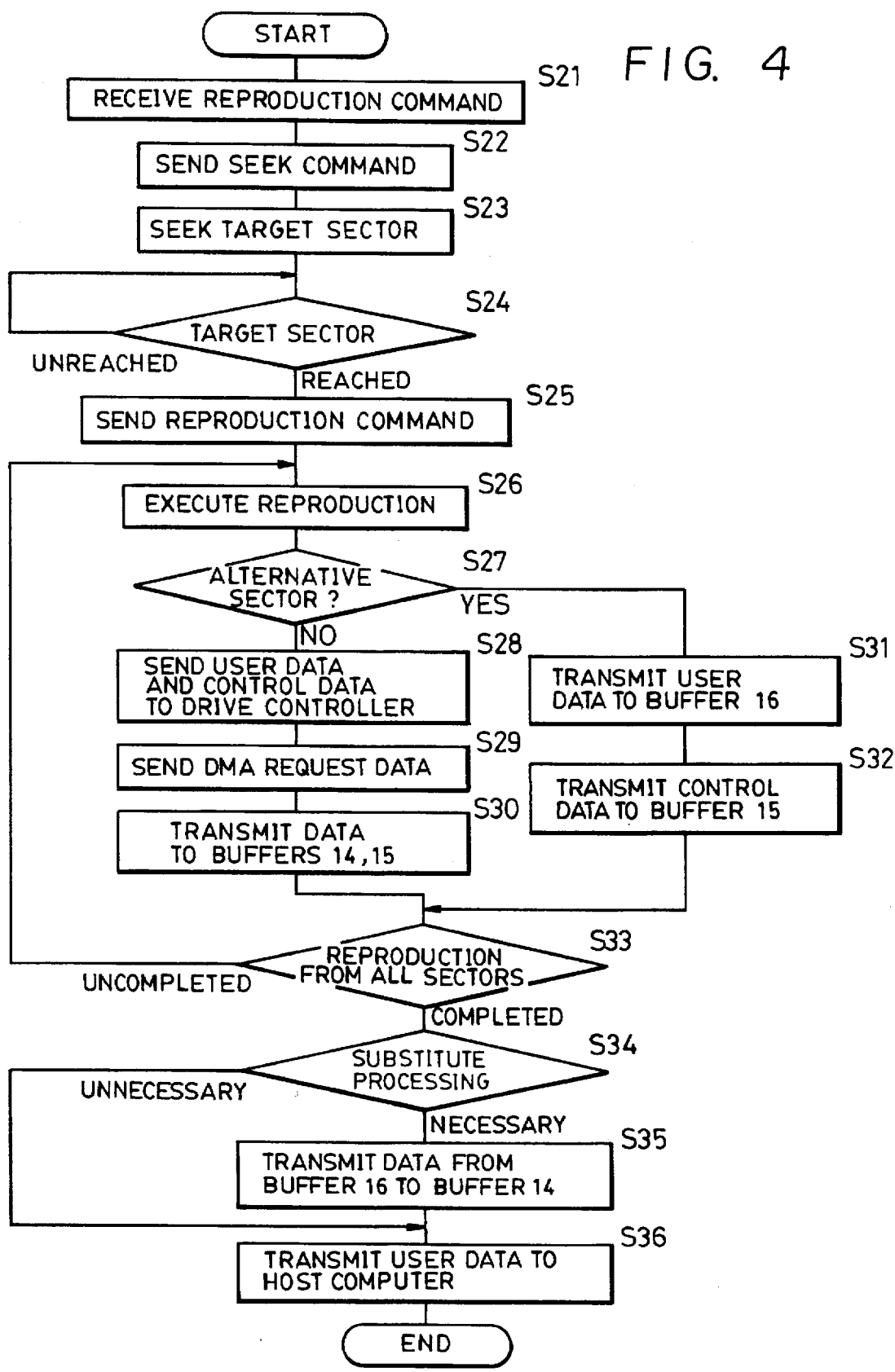
FIG. 4 is a flow chart of a control process for the second embodiment conducted during reproduction, mainly showing the operation of a microprocessor.

FIG. 4 is a flow chart of a control process for information recording/reproducing apparatus 1 conducted during reproduction, mainly showing the operation of the microprocessor 20.

In the case of the information recording medium 19 being set in this information recording/reproducing apparatus 1, a reproduction command may be sent from the host computer 18 to the host interface controller 17 and may be received by the microprocessor 20 (S21). When the microprocessor receives the reproduction command and before transmitting this reproduction command to the drive controller 22, the microprocessor 20 sends a seek command to the read/write section 23 through the drive controller 22 (S22). The seek command is a command for moving the light beam 130 to a target sector and obtaining the physical address of the target sector.

The read/write section 23 moves the light beam 130 in accordance with the seek command and successively reproduces address information 51 from each sector to find the target sector 50 (S23). The address information 51 recorded in the sector 50 is simultaneously sent to the drive controller 22, and the drive controller 22 ascertains the present position of the light beam from the address information 51. When the target sector is reached by the light beam 130 under the control of the read/write section 23 (S24), information which indicates that the target sector is reached is transmitted to the microprocessor 20 through drive controller 22.

Then microprocessor 20 sends the above-mentioned reproduction command to the drive controller 22 (S25). This reproduction command, which contains the information 51 on the physical address of the target sector, is transmitted to the read/write section 23 as in the case of the seek command. The address information 51 recorded in the target sector is reproduced again with the light beam 130 (S26) to verify the address information 51 (S27). Thereafter, user data 52 and control data 53 recorded in this sector are sent to the drive controller 22 (S28). The drive controller 22 sends DMA request data in accordance with the categories of data to the DMA controller 21 to effect DMA transfer of the user data 52 and the control data 53 to the buffer memories 14 and 15 in accordance with the predetermined number of date items from the top of the sector (S29). The DMA controller 21, in which different transfer destinations are set by the DMA channels of the microprocessor 20, sends each category of data to the buffer memory 14 or 15 under this instruction (S30).

The same process is repeated for reproduction from the selected sectors.

If in step S27 the reproduced address information indicates that the present sector is an alternative sector 70, user data 72 recorded in the alternative sector 70 is transferred to the buffer memory 16 in the DMA transfer manner (S31).

Also, control data 73 recorded in the alternative sector 70 is DMA-transferred to the buffer memory 15 (S32).

The identification of the alternative sector 70 may be effected in such a manner that the microprocessor 20 successively reads address information from the sectors or in such a manner that the microprocessor 20 previously sets address information recorded in alternative sectors 70 in the drive controller 22 and the drive controller 22 compares the set information with each of the addresses read out.

After reproduction from the designated sectors has been completed (S33), the microprocessor 20 determines whether or not substitute processing is necessary from the control data 52 stored in the buffer memory 15 (S34). If substitute processing is necessary, the alternative data stored in the buffer memory 16 is transferred to the corresponding user data sections of the buffer memory 14 (S35). In this case, defective data in the buffer memory 14 is rewritten to correct data by overwriting. After these steps have been completed, the microprocessor 20 controls the DMA controller 21 to transfer the processed user data from the buffer memory 14 to the host computer 18 via the host interface controller 17 (S36).

Figure 5:
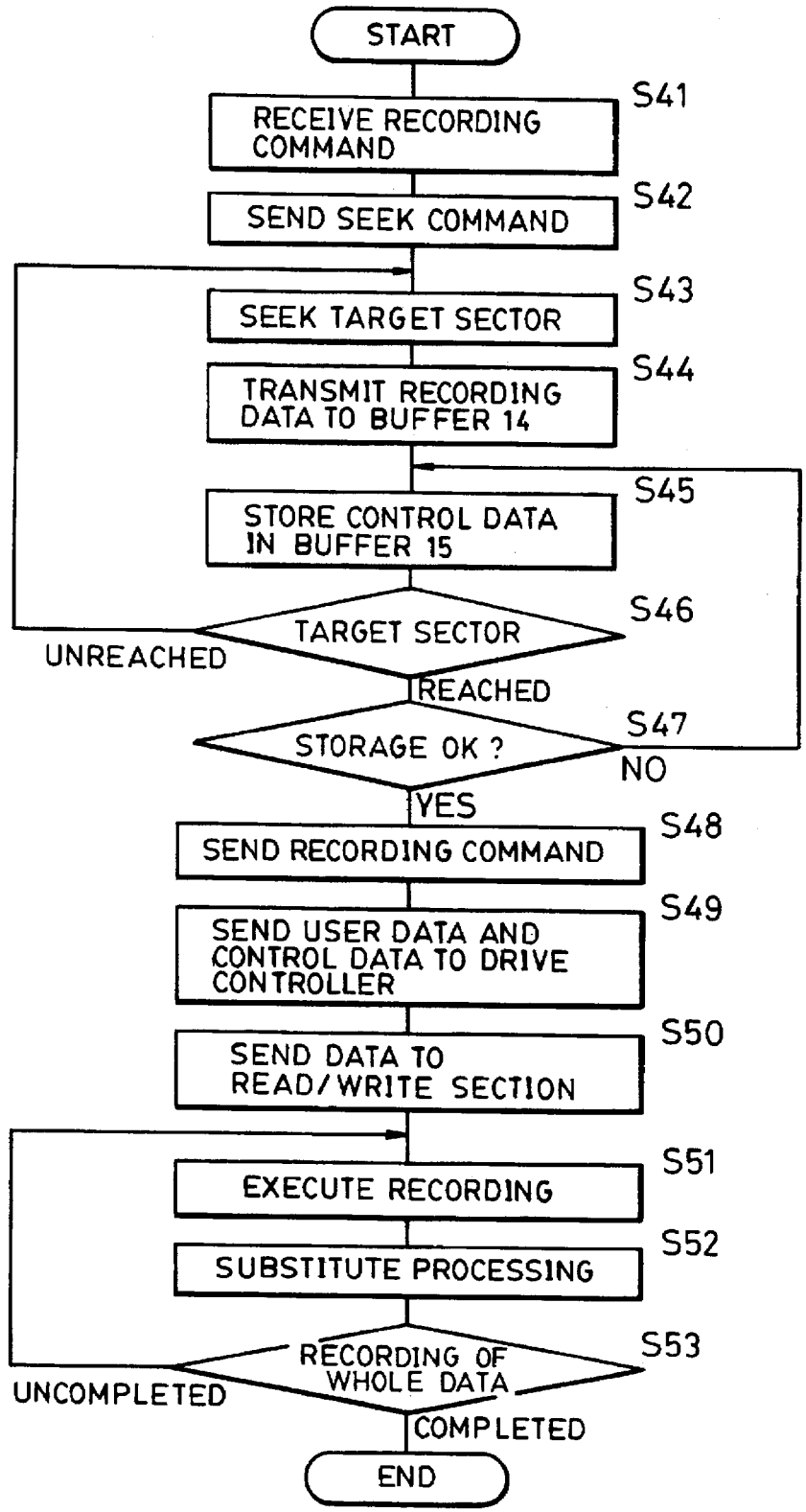
FIG. 5 is a flow chart of a control process for the second embodiment conducted during recording, mainly showing the operation of the microprocessor.

FIG. 5 is a flow chart of a control process for this information recording/reproducing apparatus 1 conducted during recording, mainly showing the operation of the microprocessor 20.

First, as in the case of reproduction, the microprocessor 20 receives a recording command from the host computer 18 (S41) and then issues a seek command (S42) make the read/write section 23 seek a target sector to In parallel with this operation, data to be recorded is (S43). transferred from the host computer 18 to the buffer memory 14 (S44). This data transfer is effected as a DMA transfer under the control of the DMA controller 21. After all of the data to be recorded has been transferred to the buffer memory 14, the microprocessor 20 outputs and stores control data successively in the buffer memory 15 (S45). When the target sector is found by seeking with the read/write section 23 (S46) and when the desired control data is accumulated in the buffer memory 15 (S47), the microprocessor 20 sends the recording command to the read/write section 23 through the drive controller 22 (S48). Simultaneously, DMA controller 21 successively DMA-transfers the user data stored in the buffer memory 14 and the control data stored in the buffer memory 15 to the drive controller 22 a predetermined amount at a time (S49). The drive controller 22 successively transfers the DMA-transferred data to the read/write section 23 (S50), and the read/write section 23 records the data at predetermined positions on the information recording medium 19 by using the light beam 130 (S51). Alternative sectors 70 are used, for example, in such a manner that after a sequence of recording has been completed, the record is reproduced and the information recorded in sectors where reproduction defects occur is recorded again in alternative sectors (S52). In this case, the control data 73 contains information on the addresses of the corresponding defective sectors.

The above process steps are repeated to record all of the data before the process ends (S53).

Details of the above-mentioned drive controller 22 will be described below.

Figure 6:
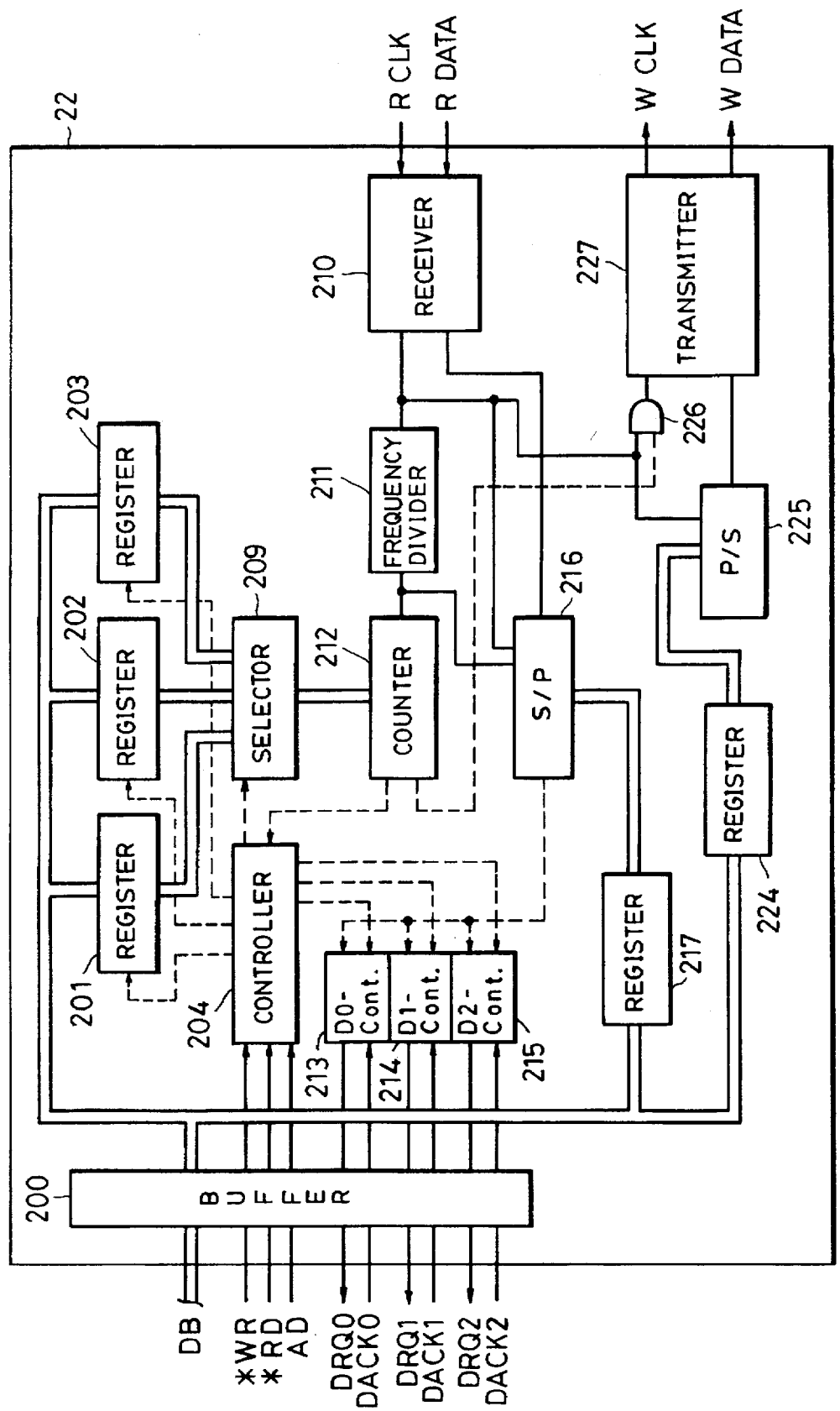
FIG. 6 is a block diagram of details of a drive controller provided in the second embodiment.

FIG. 6 is a block diagram of the drive controller 22 showing details of the same.

The drive controller 22 has an input buffer 200, a counter 212, a register 201 for setting in the counter 212 the number of bytes of address information 51 recorded in each sector 50, a register 202 for setting in the counter 212 the number of bytes of user data 52 recorded in each sector 50, a register 203 for setting in the counter 212 the number of bytes of control data 53 recorded in each sector 50, and a controller 204 for controlling the registers 201 to 203. The controller 204 is supplied with a write signal *WR, a read signal *RD and address information AD. The symbol * indicates negative logic data.

The drive controller 22 also has a selector 209 for changing over, under the control of the controller 204, data representing the number of bytes of the data stored in the registers 201 to 203 and for setting the changed-over data in the counter 212, a receiver 210 for receiving reproduced data or status data supplied from the read/write section 23, and a frequency divider circuit 211 for dividing read clock RCLK received through the receiver 210. The counter 212 counts twofold-period, fourfold-period and eightfold-period read clocks which are frequency-divided by the frequency divider circuit 211. The drive controller 22 further has DMA channel controllers 213 to 215 for actuating DMA channels 0 to 2 under the control of the controller 204, an S/P circuit 216 for converting serial read data RDATA received by the receiver 210 into parallel data, a register 217 for holding the parallel data converted by the S/P circuit 216, a register 224 for holding data input from a data bus DB through the buffer 200 under the control of the controller 204, a P/S circuit 225 for converting the parallel data held by the register 224 into serial data, an AND gate 226 for controlling the read clock input through the receiver 210 based on the count output from the counter 212, and a transmitter 227 for transmitting the serial output from the P/S circuit 225 and so on.

Each of the DMA channel controllers 213 to 215 is supplied with a request signals DRQ0, DRQ1 or DRQ2 designating the corresponding channel, and outputs an acknowledge signal DACK0, DACK1 or DACK2 designating the corresponding channel.

The transmitter 227 outputs write clock WCLK obtained by controlling the read clock RCLK by the AND gate 226, and serial write data WDATA produced by the P/S circuit 225.

FIGS. 7(a) to (k) are diagrams showing the timings of signals input into or output from the thus-constructed drive controller 22 during reproduction.

Figure 7:
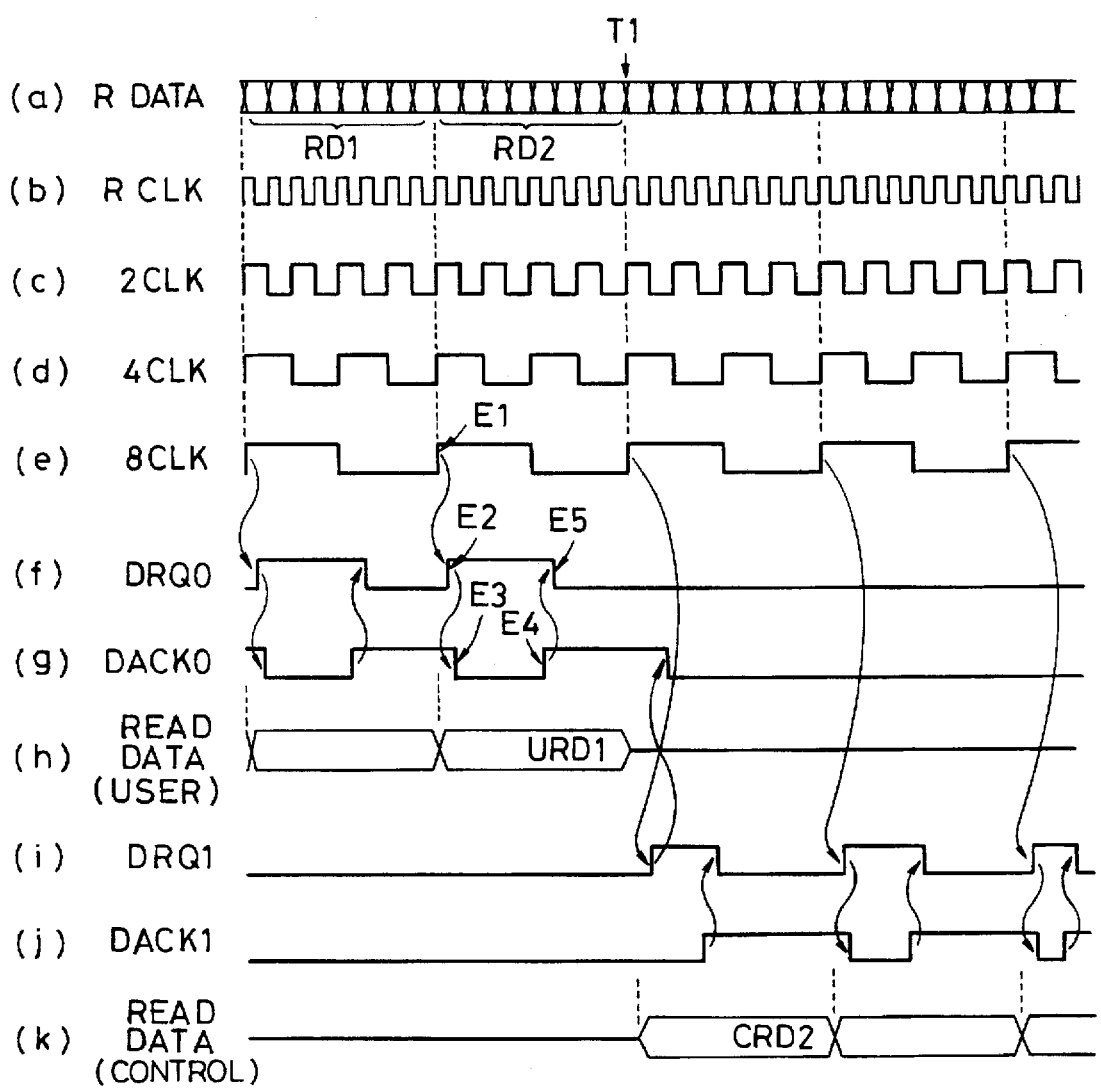
FIGS. 7(a) to 7(k) are diagrams showing the timings of signals input into or output from the drive controller during reproduction.

FIG. 7(a) shows the serial read data RDATA, and FIG. 7(b) shows the read clock RCLK. FIGS. 7(c) to 7(e) show the twofold-period clock, the fourfold-period clock and the eightfold-period clock frequency-divided by the frequency divider circuit 211. FIG. 7(f) shows the request signal DRQ0, FIG. 7(g) shows the acknowledge signal DACK0, and FIG. 7(h) shows reproduced user data transferred in the DMA channel 0 and obtained after parallel conversion. FIG. 7(i) shows the request signal DRQ1, FIG. 7(j) shows the acknowledge signal DACK1, and FIG. 7(k) shows reproduced user data transferred through the DMA channel 1 and obtained after serial/parallel conversion.

In FIG. 7(a), a symbol RD1 indicates serial user data and a symbol RD2 indicates serial control data. In FIG. 7(h), a symbol URD1 indicates user data obtained by serial/parallel conversion of the data RD1. In FIG. 7(k), a symbol CRD2 indicates control data obtained by serial/parallel conversion of the data RD2.

Further, in FIGS. 7(a) to 7(k), a symbol T1 indicates DMA channel changeover timing, and symbols E1 to E5 indicate rising and falling edges of the signals.

FIGS. 8(a) to 8(l) are diagrams showing the timings of signals input or output from the drive controller 22 during recording.

FIG. 8(a) shows reference clock (corresponding to the read clock RCLK), FIGS. 8(b) to 8(d) respectively show the twofold-period clock, the fourfold-period clock and the eightfold-period clock frequency-divided by the frequency divider circuit 211, and FIG. 8(e) shows an inverted signal *8CLK obtained by inverting the eightfold-period clock. FIG. 8(f) shows the request signal DRQ0, FIG. 8(g) shows the acknowledgment signal DACK0, and FIG. 8(h) shows parallel write data transferred in the DMA channel 0. FIG. 8(i) shows the serial write data WDATA, FIG. 8(j) shows the write clock WCLK, FIG. 8(k) shows the request signal DRQ1, and FIG. 8(l) shows the acknowledgment signal DACK1.

In FIG. 8(h), a symbol WD1 indicates parallel user data, and a symbol WD2 indicates parallel control data. In FIG. 8(i), a symbol UWD1 indicates the user data obtained by converting the data WD1 into serial data, and a symbol CWD2 indicates the control data obtained by parallel/serial conversion of the data WD2.

Further, in FIG. 8(a), a symbol T2 indicates DMA channel changeover timing, and symbols E6 to E10 indicate rising and falling edges of the signals.

The operation of the drive controller 22 will now be described below.

Before the reproduction or recording operation is started, the numbers of bytes of categories of data contained in each sector 50 are stored in the registers 201 to 203 by the microprocessor 20. This operation is performed by designating each of the registers 201 to 203 with addresses and by sending the information indicating the number of bytes to the data bus DB. The number of bytes of address information 51 is thereby stored in the register 201, the number of bytes of user data 52 is stored in the register 202, and the number of bytes of control data 53 is stored in the register 203.

Next, a recording command or reproduction command is sent to the read/write section 23. The operation will be described below first with respect to the case where a reproduction command is sent.

When the read/write section 23 receives the reproduction command, it first seeks for the target sector 50. Next, address information 51 recorded in the target sector 50 is reproduced and is transmitted to the drive controller 22 in synchronism with the read clock RCLK. The drive controller 22 receives these signals with receiver 210. The read data RDATA is input into the S/P circuit 216 and the read clock RCLK is input into the frequency divider circuit 211 and into the S/P circuit 216. The S/P circuit 216 successively takes in the supplied read data RDATA in synchronism with the read clock RCLK and converts this data into parallel data. When 8 bits of parallel data items are thereby obtained, the S/P circuit 216 sends them to the register 217 to hold them. Simultaneously, the S/P circuit 216 informs the DMA channel controller 213 that 8-bit parallel data is obtained. That is, regarding the timing, the request signal DRQ0 rises at E2 by the rise E1 of the eightfold-period clock 8CLK.

After receiving the rise E1 of 8CLK, the DMA channel controller 213 outputs DMA transfer request to the DMA controller 21 by means of the request signal DRQ0 (E2). If the DMA controller 21 can meet the requirement, it sends the DMA channel controller 213 the acknowledgment signal DACK0 (E4) to this effect, and DMA-transfers the address information 51 stored in the register 217 to the buffer memory 14. The microprocessor 20 refers to the address information stored in the buffer memory 14 to confirm the present sector position.

After the present position has been confirmed in this manner, the operation of reproducing user data is started. User data 52 and control data 53 are reproduced generally in the same manner as the operation of reproducing the address information 51. However, the data representing the number of bytes of user data 52 is maintained in the register 202, and the controller 204 controls the selector 209 to send the data representing the number of bytes to the counter 212. The data representing the number of bytes of control data 53 is stored in the register 203 and is sent from the register 203 to the counter 212 as in the case of user data 52.

The parallel data transfer timing will be described below.

Referring to FIG. 7(a), serial read data RD1 is converted into parallel data by the S/P circuit 216 and is stored in the register 217.

The request signal DRQ0 rises at E2 based on the rise E1 of the eightfold-period clock 8CLK, and the acknowledgment signal DACK0 is simultaneously reset (at E3). The request signal DRQ0 is also reset (at E5) by the rise E4 of the acknowledgment signal DACK0.

On the other hand, the eightfold-period clock 8CLK frequency-divided by the frequency divider circuit 211 is input into the counter 212 to count the number of bytes. The counter 212 counts down, under the control of the controller 204, the data representing the number of bytes supplied through the selector 209, i.e., the value previously stored in the register 201. When the remainder becomes zero, the counter 212 sends the controller 204 information to this effect. The controller 204 controls the selector 209 to change over the selected register and to change over the channel for DMA transfer.

Next, the recording operation will be described below.

The recording operation is conducted in synchronism with the reference clock (read clock RCLK) supplied from the read/write section 23. Address information 51 recorded in each sector 50 is reproduced as in the case of the reproduction process.

Figure 8:
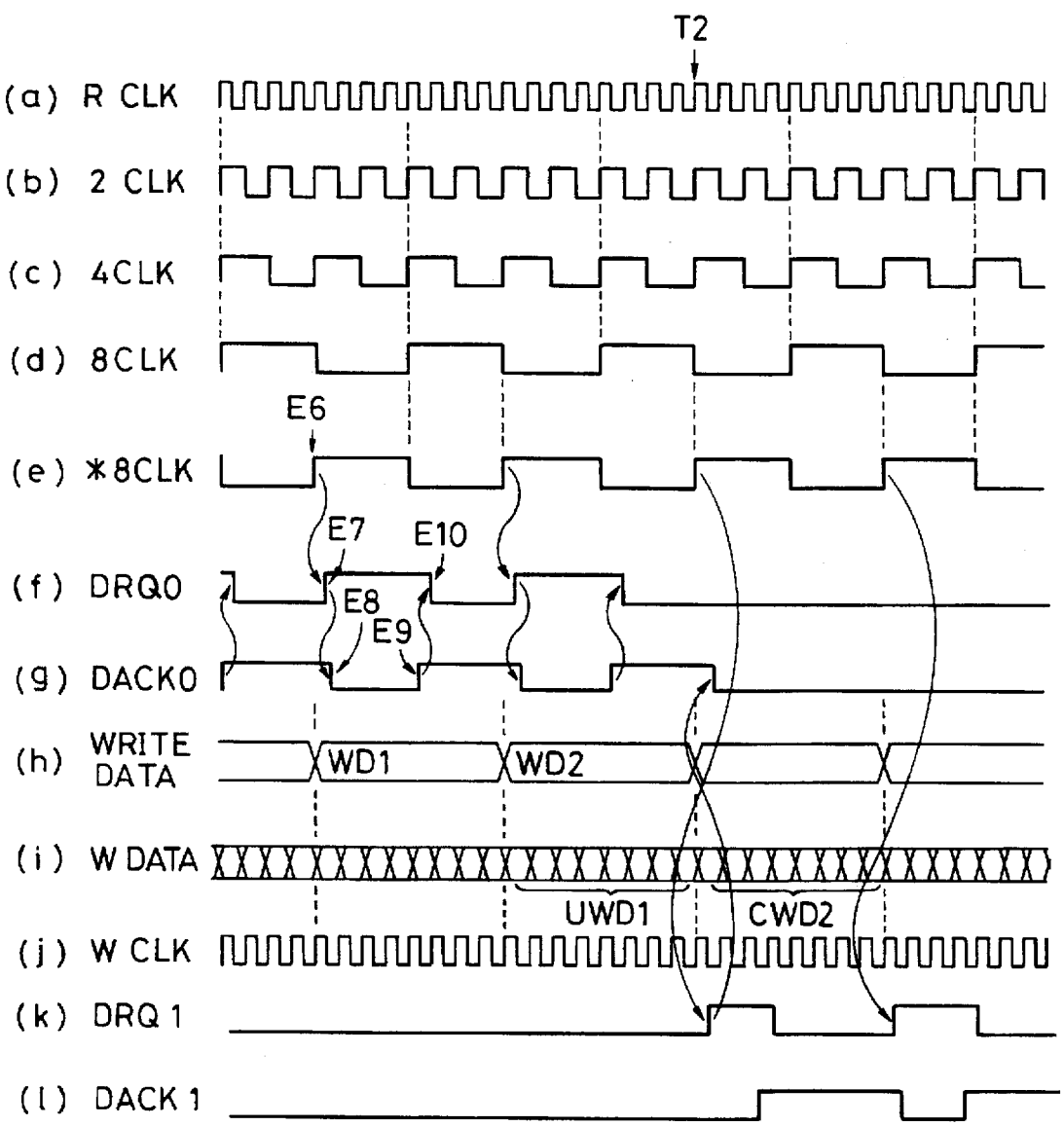
FIGS. 8(a) to 8(l) are diagrams showing the timings of signals input into or output from the drive controller during recording.

The reference clock RCLK is received by the receiver 210 and is frequency-divided by the frequency divider circuit 211 at each frequency dividing ratio and is input into the counter 212. The counter 212 inverts the input frequency-divided signal and transfers the inverted signal to the controller 204. The controller 204 selects one of the channel controllers 213 to 215 in accordance with the DMA channel to be used and sends the inverted frequency-divided signal therethrough. FIG. 8 shows a state in which the control is changed over from the DMA channel 0 to the DMA channel 1.

The DMA channel controller 213 raises (at E7) the request signal DRQ0 in synchronism with the rise E6 of the inverted eightfold-period clock *8CLK, and output DMA transfer request to the DMA controller 21. At this time, the acknowledgment signal DACK0 is reset (at E8). Thereafter the DMA controller 21 raises the acknowledgment signal DACK0 (at E9) and writes the parallel data in the register 224. Data WD1 and data WD2 held by the register 224 are taken in the P/S circuit 225, are thereby converted into serial data UWD1 and serial data CWD2 and are thereafter transmitted to the read/write section 23 in synchronism with the write clock WCLK by the transmitter 227. The write clock WCLK is gated by the AND gate 226 based on the output from the counter 212 so as to be output to the write clock terminal only for the required times.

The changeover between the user data 52 and the control data 53 in terms of timing is the same as the reproduction process.

As described above, information stored in the recording medium is stored in a storage area selected according to the category of information, thereby making it possible to easily combine different categories of information transferred to the host unit and, hence, to increase the transfer speed.

It is to be understood that the present invention is not limited to the above-described embodiments and that it is intended to cover all changes and modifications which do not constitute departures from the scope of the invention as set forth in the appended claims.

What is claimed is:

1. An information reproducing apparatus for reading out information recorded on a recording medium having a plurality of information tracks and for transferring read-out information to a host computer, each of said information tracks having a plurality of recording blocks and at least one alternative recording block and for outputting the read information to a host computer, the information recorded in the recording blocks and the alternative recording block, each of the blocks comprising address data indicating a position of each block, user data recorded by a user as desired and control data for controlling the user data, said apparatus comprising:

read means for reading out the information recorded on the recording medium;

storage means for temporarily storing the information read out by said read means, said storage means having a first storage area for storing the user data read out from the recording blocks, a second storage area for storing the user data read out from the alternative recording block and a third storage area for storing the control data; and input means for inputting a command for reproducing desired information recorded on the recording medium, wherein said read means reads out sequentially the information from the recording blocks and the alternative recording block, regardless of existence or non-existence of any defect in the recording blocks, in response to input of the command by said input means, the user data read out from the recording blocks are stored in the first storage area of said storage means, the user data read out from the alternative recording block are stored in the second storage area of said storage means, the control data read out from the recording blocks and the alternative recording block are stored in the third storage area of said storage means, the user data stored in the first and the second storage areas are reconstituted in accordance with the control data stored in the third storage area after one unit of information to be transferred at a time to the host computer has been stored in said storage means, and the reconstituted user data are transferred to the host computer.

2. An apparatus according to claim 1, further comprising transfer means for transferring the information read out by said read means to said storage means in a DMA transfer method.

3. An apparatus according to claim 2, wherein said transfer means changes a method of transferring information according to a kind of the information to be transferred.

4. An apparatus according to claim 1, wherein said storage means controls so as to store the user data in the first storage area or the second storage area in accordance with the address data.

5. An apparatus according to claim 1, wherein said storage means is controlled so as to store the user data, stored in the second storage area, in a proper area within the first storage area in accordance with the control data stored in the third storage area.

6. An information reproducing method in an information reproducing apparatus for reading out information recorded on a recording medium having a plurality of information tracks and for transferring read-out information to a host computer, each of said information tracks having a plurality of recording blocks and at least one alternative recording block and for outputting the read information to a host computer, the information recorded in the recording blocks and the alternative recording block, each of the blocks comprising address data indicating a position of each block, user data recorded by a user as desired and control data for controlling the user data, said method comprising the steps of:

inputting a command for reproducing desired information recorded on the recording medium;

reading out sequentially the information from the recording blocks and the alternative recording block, regardless of existence or non-existence of any defect in the recording blocks, in response to input of the command;

storing the user data read out from the recording blocks in a first storage area of a storage means; storing the user data read out from the alternative recording block in a second storage area of the storage means; and storing the control data read out from the recording blocks and the alternative recording block in a third storage area of the storage means;

reconstituting the user data stored in the first and the second storage areas in accordance with the control data stored in the third storage area after one unit of information to be transferred at a time to the host computer has been stored in the storage means; and transferring the reconstituted user data to the host computer.

7. An information reproducing method according to claim 6, wherein, in said storing step, the read-out data are transferred to the storage means in a DMA transfer method.

8. An information reproducing method according to claim 6, wherein, in said storing step, an area for storing the read-out user data is determined in accordance with the read-out address data.

9. An information reproducing method according to claim 6, wherein, in said reconstituting step, the user data stored in said second storage area are stored in the first storage area in accordance with the control data.

* * * * *